(12) United States Patent
Uehara et al.

(10) Patent No.: US 11,410,123 B2
(45) Date of Patent: Aug. 9, 2022

(54) ARTICLE PLACEMENT OPTIMIZATION SYSTEM AND ARTICLE PLACEMENT OPTIMIZATION METHOD

(71) Applicant: HITACHI, LTD., Tokyo (JP)

(72) Inventors: Takeshi Uehara, Tokyo (JP); Naoki Tabaru, Tokyo (JP); Kunihiko Harada, Tokyo (JP); Kazuaki Tokunaga, Tokyo (JP)

(73) Assignee: HITACHI, LTD., Tokyo (JP)

( * ) Notice: Subject to any disclaimer, the term of this patent is extended or adjusted under 35 U.S.C. 154(b) by 337 days.

(21) Appl. No.: 16/803,604

(22) Filed: Feb. 27, 2020

(65) Prior Publication Data
US 2020/0334622 A1 Oct. 22, 2020

(30) Foreign Application Priority Data
Apr. 17, 2019 (JP) .............................. JP2019-078510

(51) Int. Cl.
*G06Q 10/08* (2012.01)
*G06N 7/00* (2006.01)
*B65G 1/137* (2006.01)

(52) U.S. Cl.
CPC ........... *G06Q 10/087* (2013.01); *B65G 1/137* (2013.01); *G06N 7/005* (2013.01)

(58) Field of Classification Search
None
See application file for complete search history.

(56) References Cited

U.S. PATENT DOCUMENTS

2013/0275277 A1* 10/2013 Mihic .................... G06Q 10/04
705/28
2014/0025420 A1* 1/2014 Joshi ................ G06Q 10/06313
705/7.23

FOREIGN PATENT DOCUMENTS

JP 09-278126 A 10/1997

* cited by examiner

*Primary Examiner* — Paul Danneman
(74) *Attorney, Agent, or Firm* — Volpe Koenig

(57) ABSTRACT

A system calculates for each frontage space which is held by a plurality of shelves and in which commodities are placed, a recommended capacity value of the commodity based on a predicted shipment volume from demand prediction of the commodity placed in the frontage space. The system determines exchange pairs (frontage space pairs) in each of which exchange of the commodities are performed based on a current capacity value and the recommended capacity value of each frontage space. Each exchange pair satisfies the following: The current capacity of a first frontage space is smaller than the recommended capacity, or the current capacity of a second frontage space is larger than the recommended capacity. The recommended capacity of the second frontage space satisfies the current capacity of the first frontage space. The recommended capacity of the first frontage space satisfies the current capacity of the second frontage space.

14 Claims, 11 Drawing Sheets

FIG. 5

LOCATION-BASED STOCK INFORMATION
431

| 500 | |
|---|---|
| COMMODITY CODE | AAA |
| LOCATION CODE | 11B-1a |
| TOTAL NUMBER OF STOCKS | 50 |
| SINGLE-ITEM CAPACITY | 0.5 |
| REPLENISHMENT LIMIT | 300 |
| NUMBER OF STORAGE DAYS OF STOCKING | 2 |
| EMERGENT REPLENISHMENT FREQUENCY | 1 |

LOCATION INFORMATION
432

| 600 | |
|---|---|
| LOCATION CODE | 11B-1a |
| LOCATION TIER CAPACITY | 1400 |

PICKING PERFORMANCE INFORMATION
433

| | |
|---|---|
| COMMODITY CODE | AAA |
| OPERATION START DATE | 2019/01/01 |
| NUMBER OF OPERATED PERFORMANCE | 20 |
| PERFORMANCE LOCATION CODE | 11B-1a |

FIG. 8

CAPACITY CLASSIFICATION INFORMATION
432

| | |
|---|---|
| MINIMUM CAPACITY | 0.0 |
| MAXIMUM CAPACITY | 0.5 |
| CAPACITY CLASSIFICATION | 1 |

CURRENT STATE INFORMATION
431

| 1000 | |
|---|---|
| COMMODITY CODE | AAA |
| LOCATION CODE | 11B-1a |
| CURRENT CAPACITY (MINIMUM VALUE) | 150 |
| CURRENT CAPACITY (MAXIMUM VALUE) | 300 |

| LOCATION CODE | MINIMUM VALUE OF CURRENT CAPACITY | MAXIMUM VALUE OF CURRENT CAPACITY |
|---|---|---|
| 11A-2a | 200 | 200 |
| 11A-2b | 300 | 900(=200+300+200+200) |
| 11A-2c | 200 | 400(=200+200) |
| 11A-2d | 200 | 400 (=200+200) |
| 11A-2e | 200 | 600 (=200+200+300) |
| 11A-2f | 300 | 300 |

FIG. 13

A GROUP INFORMATION
160A

1300

| | |
|---|---|
| 1301 COMMODITY CODE | JJJ |
| 1302 LOCATION CODE | 11J-1a |
| 1303 CURRENT CAPACITY CLASSIFICATION | 1-3 |
| 1304 RECOMMENDED CAPACITY CLASSIFICATION (MINIMUM VALUE) | 8 |
| 1305 RECOMMENDED CAPACITY CLASSIFICATION (MAXIMUM VALUE) | 10 |
| 1306 RECOMMENDED REPLENISHING POINT (MINIMUM VALUE) | 400 |
| 1307 RECOMMENDED REPLENISHING POINT (MAXIMUM VALUE) | 500 |
| 1308 MAXIMUM SHIPMENT VOLUME | 450 |
| 1309 CAPACITY DIFFERENCE | -7 |
| 1310 EMERGENT REPLENISHMENT FREQUENCY | 40 |

FIG. 14

B GROUP INFORMATION
160B

1400

| | |
|---|---|
| 1401 COMMODITY CODE | FFF |
| 1402 LOCATION CODE | 11C-1a |
| 1403 CURRENT CAPACITY CLASSIFICATION | 4-6 |
| 1404 RECOMMENDED CAPACITY CLASSIFICATION (MINIMUM VALUE) | 1 |
| 1405 RECOMMENDED REPLENISHING POINT (MAXIMUM VALUE) | 3 |
| 1406 RECOMMENDED REPLENISHING POINT (MINIMUM VALUE) | 100 |
| 1407 RECOMMENDED REPLENISHING POINT (MAXIMUM VALUE) | 200 |
| 1408 MAXIMUM SHIPMENT VOLUME | 150 |
| 1409 CAPACITY DIFFERENCE | 3 |
| 1410 EMERGENT REPLENISHMENT FREQUENCY | 40 |
| 1411 STORAGE VOLUME | 100 |

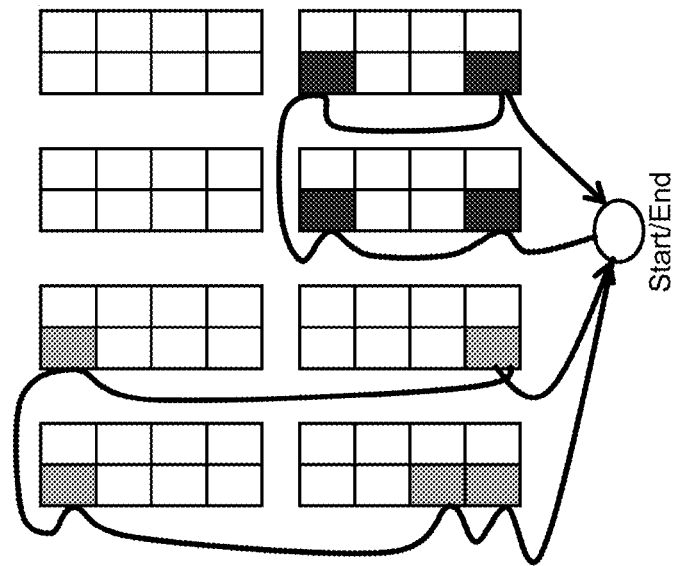
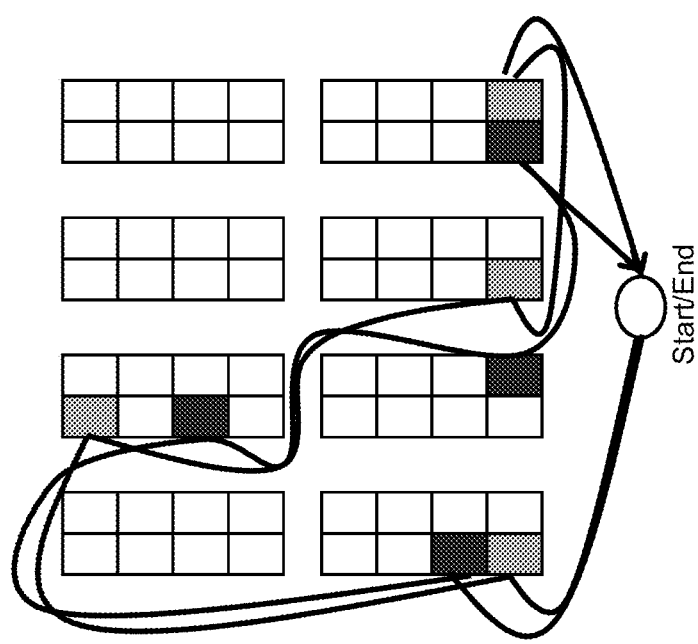
FIG. 16

FIG. 17

EXCHANGE LIST INFORMATION
904

| 1700 | |
|---|---|
| 1701 LOCATION CODE (A GROUP) | 11P-1a |
| 1702 CURRENT CAPACITY CLASSIFICATION (A GROUP) | 1 |
| 1703 COMMODITY CODE (A GROUP) | PPP |
| 1704 COMMODITY NAME (A GROUP) | TEA |
| 1705 SINGLE-ITEM CAPACITY (A GROUP) | 0.5 |
| 1706 LOCATION CODE (B GROUP) | 11Q-2c |
| 1707 CURRENT CAPACITY CLASSIFICATION (B GROUP) | 10 |
| 1708 COMMODITY CODE (B GROUP) | QQQ |
| 1709 COMMODITY NAME (B GROUP) | BEER |
| 1710 SINGLE-ITEM CAPACITY (B GROUP) | 0.5 |

ARTICLE PLACEMENT OPTIMIZATION SYSTEM AND ARTICLE PLACEMENT OPTIMIZATION METHOD

CROSS-REFERENCE TO PRIOR APPLICATION

This application relates to and claims the benefit of priority from Japanese Patent Application number 2019-78510, filed on Apr. 17, 2019 the entire disclosure of which is incorporated herein by reference.

BACKGROUND

The present invention generally relates to a technique for optimizing placement of an article using a computer.

An example of a technique for optimizing placement of an article on a shelf includes a technique disclosed in PTL1. PTL1 discloses that an article is transferred to a storage shelf having a capacity suitable for a replenishment frequency of the article.

PTL1: Japanese Patent Application Publication No. H09-278126

SUMMARY

According to the technique in PTL1, when the replenishment frequency (a frequency of a replenishment operation) of the article frequently changes, an exchange operation (transfer operation) of the article may be frequently performed. When an exchange frequency (a frequency of the exchange operation) of the article increases, the efficiency of article storage work including the replenishment operation and a picking operation of the article (e.g., warehouse work) decreases.

In the case where, in order to avoid the increase of the exchange frequency, the exchange operation is not performed even when the replenishment frequency changes, the replenishment frequency may increase. When the replenishment frequency increases, the efficiency of the article storage work decreases.

A system calculates, for each of a plurality of frontage spaces which are held by a plurality of shelves and in which a plurality of commodities are placed, a recommended capacity value of the commodity based on a predicted shipment volume obtained as a result of demand prediction of the commodity placed in the frontage space in a future specified time period. The system determines one or more exchange pairs which are frontage space pairs each in which exchange of the commodity is performed based on a current capacity value and the recommended capacity value of each of the plurality of frontage spaces. The current capacity value of each frontage space is a value which means a capacity of the frontage space. The recommended capacity value of each frontage space is a value which means a frontage space capacity predicted to be required by the commodity placed in the frontage space in a unit time period in the specified time period. Each of the one or more exchange pairs satisfies the following conditions.

(a) The current capacity value of a first frontage space which is one of frontage spaces constituting the exchange pair is smaller than the recommended capacity value of the first frontage space, or the current capacity value of a second frontage space which is another one of the frontage spaces constituting the exchange pair is larger than the recommended capacity value of the second frontage space.

(b) The recommended capacity value of the second frontage space satisfies the current capacity value of the first frontage space.

(c) The recommended capacity value of the first frontage space satisfies the current capacity value of the second frontage space.

According to the present invention, it is possible to reduce the replenishment frequency and the exchange frequency of the article.

BRIEF DESCRIPTION OF THE DRAWINGS

FIG. 5 shows an example of the structure of location-based stock information;

FIG. 6 shows an example of the structure of location information;

FIG. 7 shows an example of the structure of picking record information;

FIG. 8 shows an example of the structure of capacity classification information;

FIG. 13 shows an example of the structure of A group information;

FIG. 14 shows an example of the structure of B group information;

FIG. 16 shows an example of exchange effect measurement; and

FIG. 17 shows an example of the structure of exchange list information.

DESCRIPTION OF EMBODIMENTS

Figure 1:
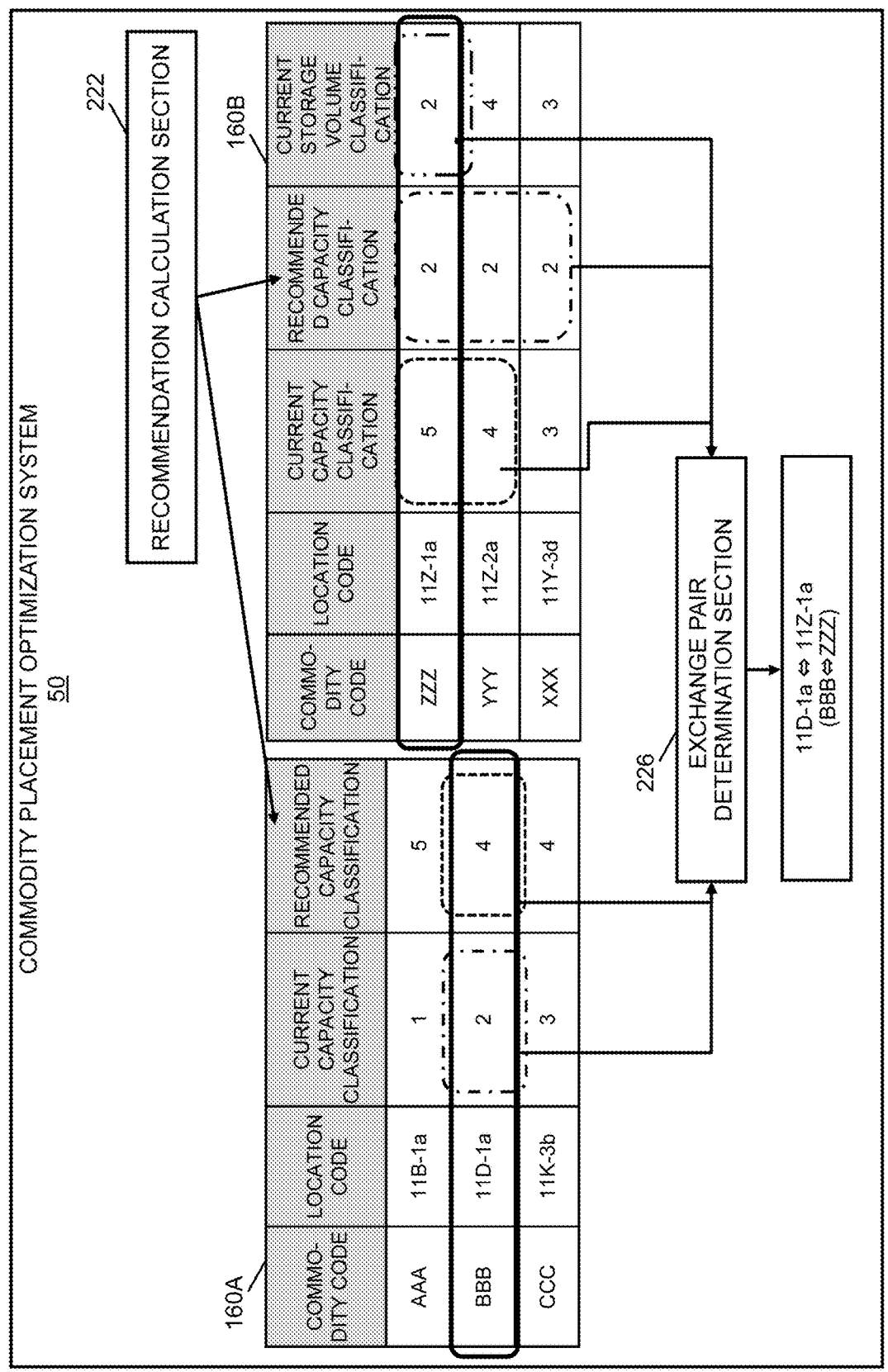
FIG. 1 shows the outline of an embodiment of the present invention.

In the following description, an "interface apparatus" may be one or more interface devices. The one or more interface devices may be at least one of the following.

One or more Input/Output (I/O) interface devices. The Input/Output (I/O) interface device is an interface device corresponding to at least one of an I/O device and a remote computer for display. The I/O interface device corresponding to the computer for display may be a communication interface device. At least one I/O device may be a user interface device, e.g., any of input devices such as a keyboard and a pointing device, and an output device such as a display device.

One or more communication interface devices. One or more communication interface devices may be one or more communication interface devices of the same type (e.g., one or more network interface cards (NICs)), or may also be two or more communication interface devices of different types (e.g., the NIC and a host bus adapter (HBA)).

In addition, in the following description, a "memory" is one or more memory devices, and may be typically a main storage device. At least one memory device in the memory may be a volatile memory device or may also be a non-volatile memory device.

Further, in the following description, "persistent storage" is one or more persistent storage devices. The persistent storage device is typically a non-volatile storage device (e.g., an auxiliary storage device), and is specifically, e.g., a hard disk drive (HDD) or a solid state drive (SSD).

In addition, in the following description, a "storage apparatus" may be, out of the memory and the persistent storage, at least the memory.

Further, in the following description, a "processor" is one or more processor devices. At least one processor device is typically a microprocessor device such as a central processing unit (CPU), but may also be a processor device of another type such as a graphics processing unit (GPU). At least one processor device may be a single-core processor or a multi-core processor. At least one processor device may also be a processor core. At least one processor device may also be a processor device in a broad sense such as a hardware circuit (e.g., a field-programmable gate array (FPGA) or an application specific integrated circuit (ASIC)) which performs part of or entire processing.

In addition, in the following description, while a function is sometimes described by using an expression "kkk section", the function may be implemented by executing one or more computer programs with a processor, or may also be implemented by one or more hardware circuits (e.g., the FPGA or the ASIC). In the case where the function is implemented by executing the program with the processor, specific processing is performed while a storage apparatus and/or an interface apparatus is appropriately used, and hence the function may be at least part of the processor. Processing described by using a function as the subject may be processing performed by a processor or an apparatus having the processor. The program may be installed from a program source. The program source may be, e.g., a program distribution computer or a recording medium (e.g., a non-transitory recording medium) which can be read by a computer. The description of each function is an example, and a plurality of functions may be unified into one function or one function may be divided into a plurality of functions.

Further, in the following description, an "article placement optimization system" may be one or more physical computers, or may also be a software-defined system which is implemented by executing predetermined software with at least one physical computer. For example, in the case where the computer has a display device and displays information in the display device of the computer, the computer may be the article placement optimization system. In addition, for example, in the case where a first computer (e.g., a server) transmits output information to a remote second computer (a computer for display (e.g., a client)) and the computer for display displays the information (the first computer displays the information in the second computer), out of the first computer and the second computer, at least the first computer may be the article placement optimization system. That is, that the article placement optimization system "displays the output information" may correspond to that the output information is displayed in the display device of the computer, or may also correspond to that the computer transmits the output information to the computer for display (in the case of the latter, the output information is displayed by the computer for display).

In addition, in the following description, a "date" is expressed in the form of, e.g., year, month, and day. However, the date may also be an example of a time of day. The time of day may be expressed in the form of year, month, day, hour, minute, and second (or rougher or more precise expression), or may also be expressed in another manner.

Further, in the following description, in the case where elements of the same type are described without being differentiated from each other, common parts of reference numerals are sometimes used. In the case where elements of the same type are differentiated from each other and described, entire reference numerals are sometimes used. For example, in the case where frontage spaces are described without being differentiated from each other, a frontage space is sometimes described as a "frontage space 11". In the case where individual frontage spaces are differentiated from each other and described, frontage spaces are sometimes described as a "frontage space 11A-1*a*" and a "frontage space 11A-1*b*".

Hereinbelow, an embodiment of the present invention will be described based on the drawings. Note that, in the following embodiment, let us assume that a commodity is used as an example of an article, and a replenishment operation and a picking operation of the commodity are performed in a warehouse. The "replenishment operation" is an operation for replenishing a shelf with the commodity. The "picking operation" includes at least picking the commodity from the shelf and, in the present embodiment, let us assume that the picking operation further includes conveying the picked commodity to a predetermined point by using a worker or a machine. The present invention can be applied to a distribution industry or a manufacturing industry in which, out of the replenishment operation and the picking operation, at least the replenishment operation is performed. In addition, the present invention can also be applied to placement of an article on a shelf placed in another area such as a store instead of the warehouse. Further, the present invention can also be applied to placement of an article other than the commodity (e.g., parts of a product).

FIG. 1 shows the outline of the embodiment of the present invention.

A commodity placement optimization system 50 has a recommendation calculation section 222, and an exchange pair determination section 226.

The recommendation calculation section 222 calculates, for each of a plurality of frontage spaces which are held by a plurality of shelves in a warehouse and in which a plurality of commodities are placed, a recommended capacity value (may include a range of an error caused by prediction) of the commodity based on a predicted shipment volume obtained as a result of demand prediction of the commodity placed in the frontage space in a future specified time period (specifically, based on, e.g., a predicted shipment volume and the number of days of stocking (an example of the number of stocking unit time periods)). Note that, in the present embodiment, as will be described later, among the plurality of frontage spaces, at least each frontage space in which the commodity is placed is classified into an A group or a B group. For example, the "A group" is a group having a current capacity value which is smaller than the recommended capacity value, and the "B group" is a group having the current capacity value which is larger than the recommended capacity value. Information related to the frontage space belonging to the A group is A group information 160A, and information related to the frontage space belonging to the B group is B group information 160B. The "current capacity value" of each frontage space is a value which means the capacity of the frontage space. The "recommended capacity value" of each frontage space is a value which means a frontage space capacity predicted to be required by the commodity placed in the frontage space in a unit time period (e.g., one day) in a specified time period (e.g., one week). Each of the current capacity value and the recommended capacity value may be a value which tends to increase as the capacity itself increases (e.g., the frontage space capacity itself or a classification indicative of the magnitude of the frontage space capacity).

The exchange pair determination section 226 determines one or more exchange pairs which are frontage space pairs in each of which exchange of the commodity is performed based on the current capacity value and the recommended capacity value of each of the plurality of frontage spaces. Each of determined one or more exchange pairs satisfies the following conditions (a) to (c) (an example in the case where at least one of the current capacity value and the recommended capacity value has a range will be described later).

(a) The current capacity value of a first frontage space (one frontage space) is smaller than the recommended capacity value of the first frontage space, or the current capacity value of a second frontage space (the other frontage space) is larger than the recommended capacity value of the second frontage space.

(b) The recommended capacity value of the second frontage space satisfies the current capacity value of the first frontage space (for example, the recommended capacity of the second frontage space is equal to or smaller than the current capacity of the first frontage space).

(c) The recommended capacity value of the first frontage space satisfies the current capacity value of the second frontage space (for example, the recommended capacity of the first frontage space is equal to or smaller than the current capacity of the second frontage space).

According to the present embodiment, for each of the plurality of frontage spaces, the recommended capacity value of the commodity is calculated based on the predicted shipment volume obtained as a result of the demand prediction of the commodity placed in the frontage space in the future specified time period, and the exchange pair is determined based on the magnitude relationship between the current capacity value and the recommended capacity value of each commodity (each frontage space). With this, it is possible to reduce a replenishment frequency and an exchange frequency of the article in consideration of future demand change.

Each of one or more exchange pairs may further satisfy the following condition (d).

(d) A current storage volume value which is a value meaning a capacity occupied by the article placed in the second frontage space satisfies the current capacity value of the first frontage space (for example, a current storage volume of the second frontage space (the total volume of the commodities placed in the second frontage space) is equal to or smaller than the current capacity of the first frontage space).

With this, even when all of the commodities present in the second frontage space are transferred to the first frontage space having the current capacity smaller than the current capacity of the second frontage space, it is assured that the commodities do not overflow from the first frontage space.

According to the example in FIG. 1, the present embodiment is as follows. Note that, in the following description,
a "commodity code" is an example of a commodity ID. A commodity having a commodity code α can be referred to as a "commodity α". In addition, a "location code" is an example of a location ID. In the present embodiment, the frontage space and the location correspond to each other in one-to-one relation, and hence the location code corresponds to a frontage space ID. A location having a location code β can be referred to as a "location β", and a frontage space at the location β can be referred to as a "frontage space β". In the present embodiment, the commodity of one type is placed at one location (one frontage space).

A commodity BBB satisfies the condition (a). This is because a current capacity classification (a classification (value) indicative of the magnitude of the current capacity) is smaller than a recommended capacity classification (a classification indicative of the magnitude of the recommended capacity).

The relationship among the current capacity classification of the commodity BBB and the respective recommended capacity classifications of a commodity ZZZ, a commodity YYY, and a commodity XXX satisfies the condition (b) (see frames in a one-dot chain line). This is because each of the recommended capacity classifications is equal to or smaller than the current capacity classification of the commodity BBB.

The relationship among the recommended capacity classification of the commodity BBB and the respective current capacity classifications of the commodity ZZZ and the commodity YYY satisfies the condition (c) (see frames in a broken line). This is because each of the current capacity classifications is equal to or larger than the recommended capacity classification of the commodity BBB.

A current storage volume classification (a classification indicative of the magnitude of the current storage volume) of the commodity ZZZ and the recommended capacity classification of the commodity ZZZ satisfy the condition (d) (see a frame in a two-dot chain line). This is because the current storage volume classification (the classification indicative of the magnitude of the current storage volume) of the commodity ZZZ is equal to or smaller than the recommended capacity classification of the commodity ZZZ.

As a result of the foregoing, a frontage space 11D-1$a$ in which the commodity BBB is placed and a frontage space 11Z-1$a$ in which the commodity ZZZ is placed are determined to be an exchange pair. According to the exchange pair, the commodity BBB and the commodity ZZZ are exchanged (interchanged) between the frontage space 11D-1$a$ and the frontage space 11Z-1$a$. That is, the commodity BBB is transferred from the frontage space 11D-1$a$ to the frontage space 11Z-1$a$, and the commodity ZZZ is transferred from the frontage space 11Z-1$a$ to the frontage space 11D-1$a$. In the present embodiment, with regard to the exchange pair, the first frontage space (e.g., the frontage space 11D-1$a$) is the frontage space belonging to the A group, and the second frontage space (e.g., the frontage space 11Z-1$a$) is the frontage space belonging to the B group.

Note that one of the two frontage spaces constituting the exchange pair may be an empty space which is the frontage space in which the commodity is not placed. According to such an exchange pair, the commodity may be transferred from the one of the frontage spaces to the empty space, and the one of the frontage spaces may become the empty space.

Hereinbelow, the present embodiment will be described in detail. Note that, in the present embodiment, the unit of the "capacity" of the frontage space or the commodity is, e.g., a "liter", but the unit thereof may be expressed by using other expressions, e.g., dimensions such as length (e.g., depth), width (e.g., breadth), and height. In the case where dimensions of length, width, and height are used, the following may be used in a comparison between a capacity J and a capacity K.

In the case where length, width, and height belonging to the capacity J are equal to or smaller than length, width, and height belonging to the capacity K, the capacity J is equal to or smaller than the capacity K.

In the case where any of the length, width, and height (e.g., the height) belonging to the capacity J exceeds the corresponding dimension belonging to the capacity K, the capacity J is larger than the capacity K.

Figure 2:
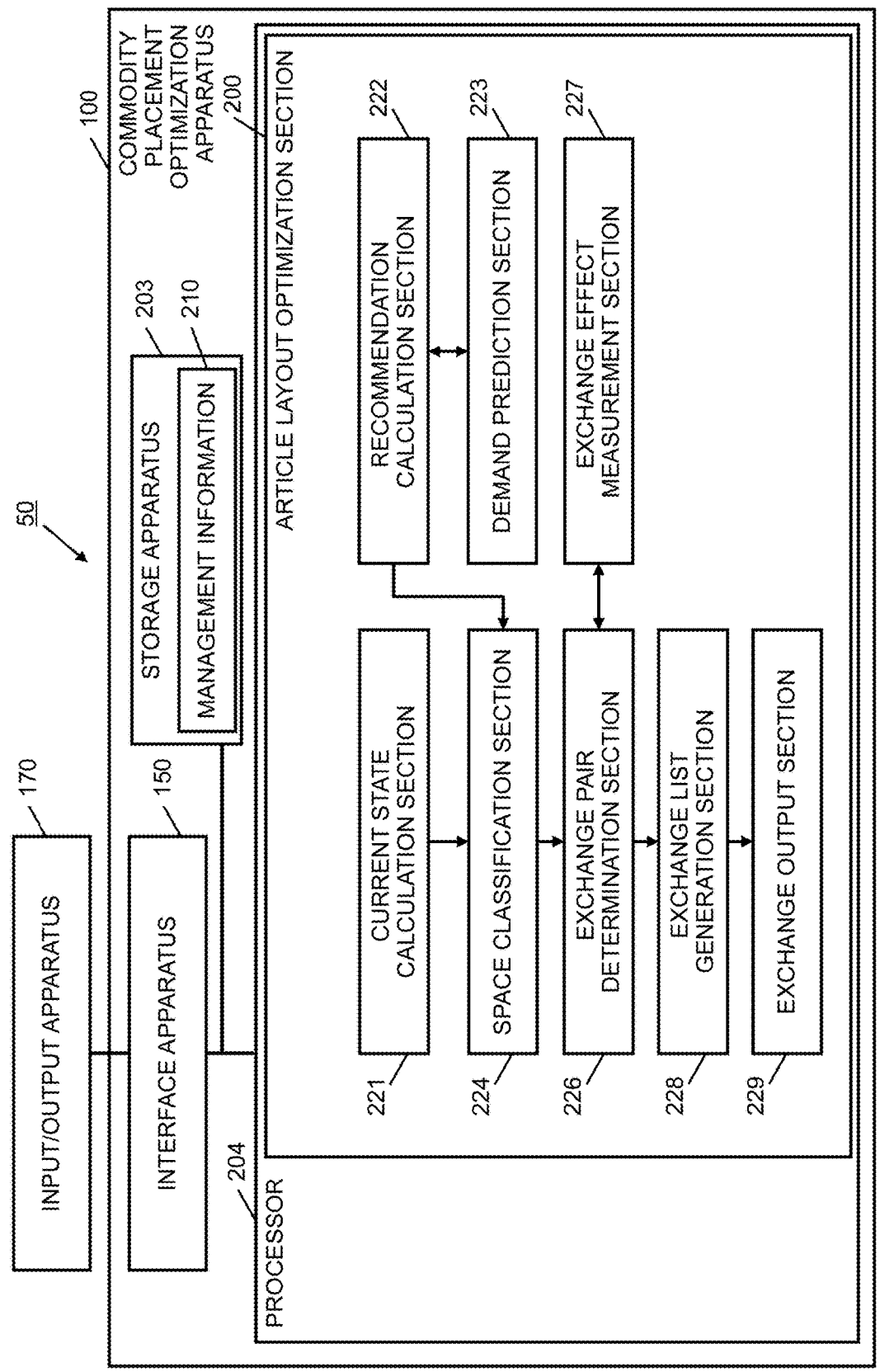
FIG. 2 shows an example of the configuration of a commodity placement optimization system according to the embodiment of the present invention.

FIG. 2 shows the configuration of a commodity placement optimization system.

A commodity placement optimization system 50 includes a commodity placement optimization apparatus 100, and an input/output apparatus 170 coupled to the commodity placement optimization apparatus 100. The input/output apparatus 170 may be an example of a computer for display, is a so-called input/output console, and may include an input device for receiving an operation of a user (e.g., a keyboard or a pointing device), and a display device in which output information from the commodity placement optimization apparatus 100 is displayed (e.g., a liquid crystal display). A touch panel in which the input device and the display device are integrated with each other may be used. Specifically, for example, the input/output apparatus 170 may be a computer capable of using a Web browser or the like such as a personal computer (e.g., a desktop, laptop, or tablet personal computer) or a smartphone which is coupled via the Internet, a local area network (LAN), or a wide area network (WAN).

The commodity placement optimization apparatus 100 may be one or more computers, and has an interface apparatus 150, a storage apparatus 203, and a processor 204 coupled to the interface apparatus 150 and the storage apparatus 203. Communication with the input/output apparatus 170 is performed via the interface apparatus 150.

The storage apparatus 203 stores one or more programs (not shown) executed by the processor 204. In addition, the storage apparatus 203 stores management information 210.

The processor 204 executes one or more programs, and a current state calculation section 221, a recommendation calculation section 222, a demand prediction section 223, a space classification section 224, an exchange pair determination section 226, an exchange effect measurement section 227, an exchange list generation section 228, and an exchange output section 229 are thereby implemented.

The current state calculation section 221 calculates the current capacity of each frontage space (for example, in the case where an adjacent frontage space is empty, a value including the capacity of the empty frontage space is used as the maximum value, and a value which does not include the capacity thereof is used as the minimum value). The recommendation calculation section 222 calculates the recommended capacity of each frontage space in which the commodity is placed (e.g., the minimum value and the maximum value of the recommended capacity). The demand prediction section 223 performs demand prediction in a specified time period for each type (e.g., prediction of change of the shipment volume). The space classification section 224 classifies a plurality of commodities into the A group and the B group. The exchange pair determination section 226 determines one or more exchange pairs. The exchange effect measurement section 227 performs exchange effect measurement including prediction of operation time including picking operation time before exchange and the operation time after the exchange. The exchange list generation section 228 generates exchange list information which is information related to the list of determined one or more exchange pairs. The exchange output section 229 outputs the generated exchange list information (or an exchange instruction which is based on the information and is issued to a worker or a machine). The exchange list information may include information indicative of at least one of the operation time and the exchange effect of, e.g., each exchange pair (or all determined one or more exchange pairs).

According to the example in FIG. 2, the demand prediction section 223 is used for the calculation of the recommended capacity by the recommendation calculation section 222. The exchange effect measurement section 227 is used for the determination of the exchange pair by the exchange pair determination section 226. At least one of the demand prediction section 223 and the exchange effect measurement section 227 may be an existing function itself or may also be a function obtained by customizing the existing function for the system according to the present embodiment. The demand prediction section 223 may be, e.g., a model for demand prediction, and the exchange effect measurement section 227 may be, e.g., a model for calculation (and comparison) of the picking operation time. As the model, it is possible to use a model created by using an existing learning method, e.g., an autoregressive moving average model (e.g., an autoregressive integrated moving average (ARIMA) model) or a neural network.

Figure 3:
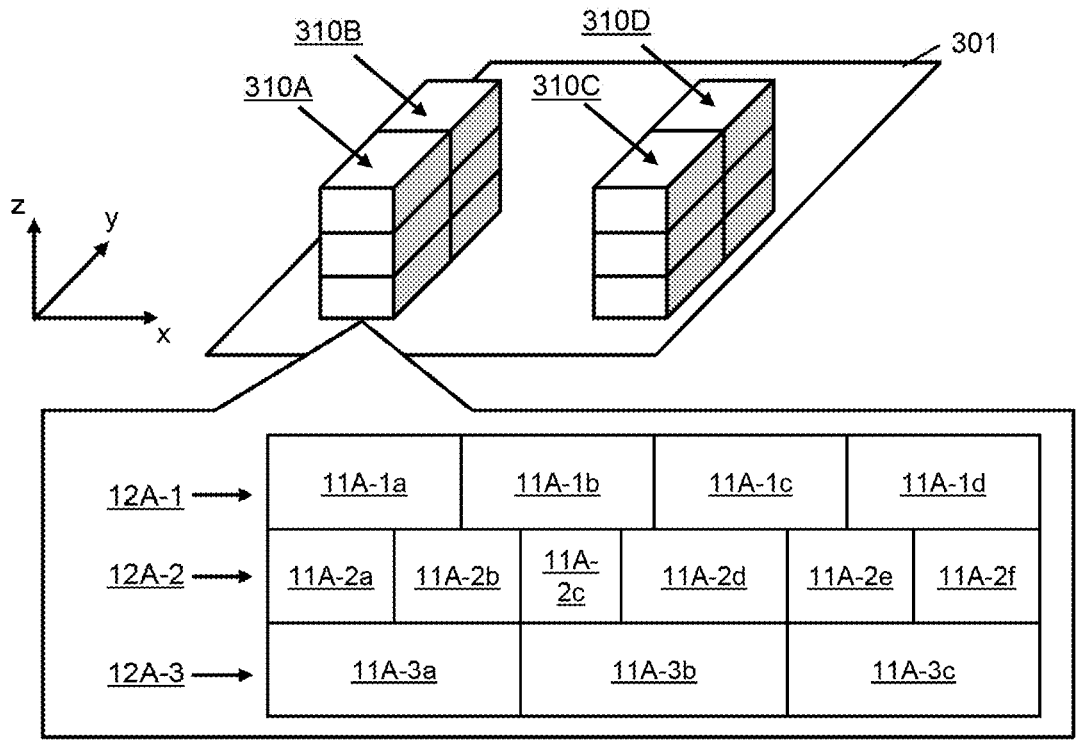
FIG. 3 shows an example of the relationship between a shelf and a frontage space.

FIG. 3 shows an example of the relationship between a shelf and the frontage space.

In a warehouse area 301, a plurality of shelves 310 (e.g., shelves 310A to 310D) are placed along a horizontal direction (e.g., an x direction and a y direction). Each shelf 310 has a plurality of tiers 12 arranged along a vertical direction (e.g., a z direction). Each tier 12 has one or a plurality of frontage spaces 11 arranged along, e.g., a lengthwise direction of the tier 12 (e.g., the y direction). The length of the tier 12 can be referred to as "breadth", and the width of the tier 12 can be referred to as "depth".

The "frontage space" may be a physically (e.g., by a plate or a wall) separated space, or may also be a virtually separated space in the tier 12. The frontage space may also be expressed by using other expressions such as a "sub-space" or a "chamber". The frontage space may be a space which extends over the entire width of the tier 12, or two or more frontage spaces may also be arranged along a width-wise direction in at least part of the tier 12. The shape of the frontage space 11 does not need to be limited to the shape of a cube or a rectangular prism. The shape of the frontage (an entrance of the commodity to the inside of the frontage space 11) of the frontage space 11 does not need to be limited to a square shape.

According to FIG. 3, the shelf 310A has three tiers 12 including an upper tier 12A-1, a middle tier 12A-2, and a lower tier 12A-3. The number of tiers 12 in one shelf 310 may be three or less or three or more. In each tier 12, the frontage spaces 11 are arrange along the lengthwise direction of the tier 12. The upper tier 12A-1 has four frontage spaces 11A-1a to 11A-1d. The middle tier 12A-2 has six frontage spaces 11A-2a to 11A-2f. The lower tier 12A-3 has three frontage spaces 11A-3a to 11A-3c. In each tier 12, the capacities of the frontage spaces 11 do not need to be equal to each other.

Figure 4:
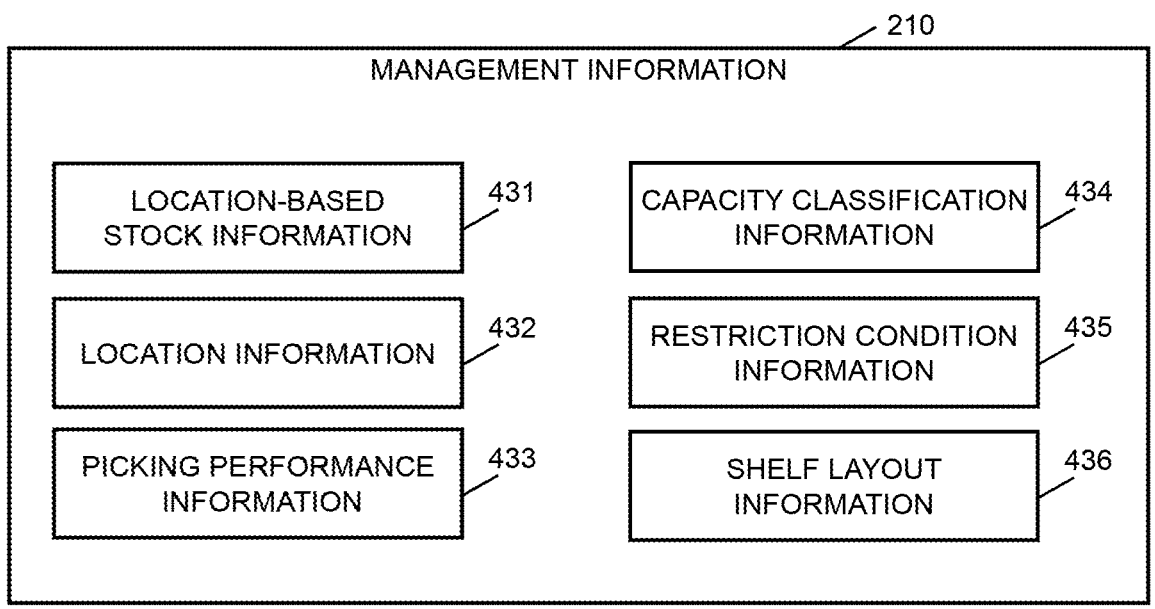
FIG. 4 shows an example of the structure of management information.

FIG. 4 shows an example of the structure of the management information 210.

The management information 210 includes location-based stock information 431, location information 432, picking record information 433, capacity classification information 434, restriction condition information 435, and shelf placement information 436. At least part of the pieces of the information 431 to 436 may be information which is received from a computer system (e.g., the input/output apparatus 170) on a user side and stored.

FIG. 5 shows an example of the structure of the location-based stock information 431.

The location-based stock information 431 has information related to the commodity placed at the location (the frontage space 11). The location-based stock information 431 has, e.g., an entry 500 for each commodity placed at the location (the frontage space 11). For one commodity (a "target commodity" in a description of FIG. 5) which is used as an example, the entry 500 stores information such as a commodity code 501, a location code 502, a total stock quantity 503, a single-item capacity 504, a replenishment limit 505, the number of days of stocking 506, and an emergency replenishment frequency 507.

The commodity code 501 indicates the commodity code (commodity ID) of the target commodity. The location code 502 indicates the location code (location ID) of the location at which the target commodity is placed. The total stock quantity 503 indicates the number of placed target commodities (single commodity type). The single-item capacity 504 indicates the capacity of the target commodity (single item). The replenishment limit 505 indicates the replenishment limit (the upper limit of the number of target commodities (single commodity type)) of the target commodity (single commodity type) at the location. The number of days of stocking 506 indicates the number of days of stocking of the target commodity (which is determined by using an order-up-to level per day (the number of target commodities (single commodity type) to be supplied per day) as a reference and indicates the number of target commodities (single commodity type) to be placed which is expressed in terms of the number of days). The product of the order-up-to level per day and the number of days of stocking is equal to or smaller than the replenishment limit. The emergency replenishment frequency 507 indicates the emergency replenishment frequency of the target commodity (e.g., a frequency of replenishment performed at timing which cannot be predicted based on the picking record of the target commodity).

The commodity code may be a code (ID) of the type of the commodity, may be a code of the commodity itself, or may also be a combination of the code of the type of the commodity and the code of the commodity itself.

In the present embodiment, the location code includes a code of the tier to which the location belongs and a code of the shelf. However, at least one of the code of the tier and the code of the shelf may be present independently of the location code.

FIG. 6 shows an example of the structure of the location information 432.

The location information 432 has information related to the location. The location information 432 has, e.g., an entry 600 for each location. For one location (a "target location" in a description of FIG. 6) which is used as an example, the entry 600 stores information such as a location code 601 and a tier capacity 602.

The location code 601 indicates the location code (location ID) of the target location. The tier capacity 602 indicates the tier capacity of the tier 12 including the target location (the capacity of the entire tier 12).

FIG. 7 shows an example of the structure of the picking record information 433.

The picking record information 433 has information related to the record of the picking operation. The picking record information 433 has, e.g., an entry 700 for each picking operation. For one commodity (a "target picking operation" in a description of FIG. 7) which is used as an example, the entry 700 stores information such as a commodity code 701, an operation start date 702, an operation record quantity 703, and a record location code 704.

The commodity code 701 indicates the commodity code of the commodity subjected to the target picking operation. The operation start date 702 indicates the data of start of the target picking operation. The operation record quantity 703 indicates the number of commodities subjected to the picking operation in the target picking operation. The record location code 704 indicates the location code of the location at which the commodity picked in the target picking operation has been placed.

FIG. 8 shows an example of the structure of the capacity classification information 434.

The capacity classification information 434 has information related to a classification rule of the capacity. The capacity classification information 434 has, e.g., an entry 800 for each capacity range. For one capacity range (a "target capacity range" in a description of FIG. 8) which is used as an example, the entry 800 stores information such as a minimum capacity 801, a maximum capacity 802, and a capacity classification 803.

The minimum capacity 801 indicates the minimum value of the target capacity range. The maximum capacity 802 indicates the maximum value of the target capacity range. The capacity classification 803 indicates a classification (value) assigned to the target capacity range. According to the example in FIG. 8, the target capacity range is equal to or larger than 0.0 and smaller than 0.5, and a classification "1" is assigned.

Hereinbelow, the outline of placement optimization processing performed in the present embodiment will be described with reference to FIG. 9.

Figure 9:
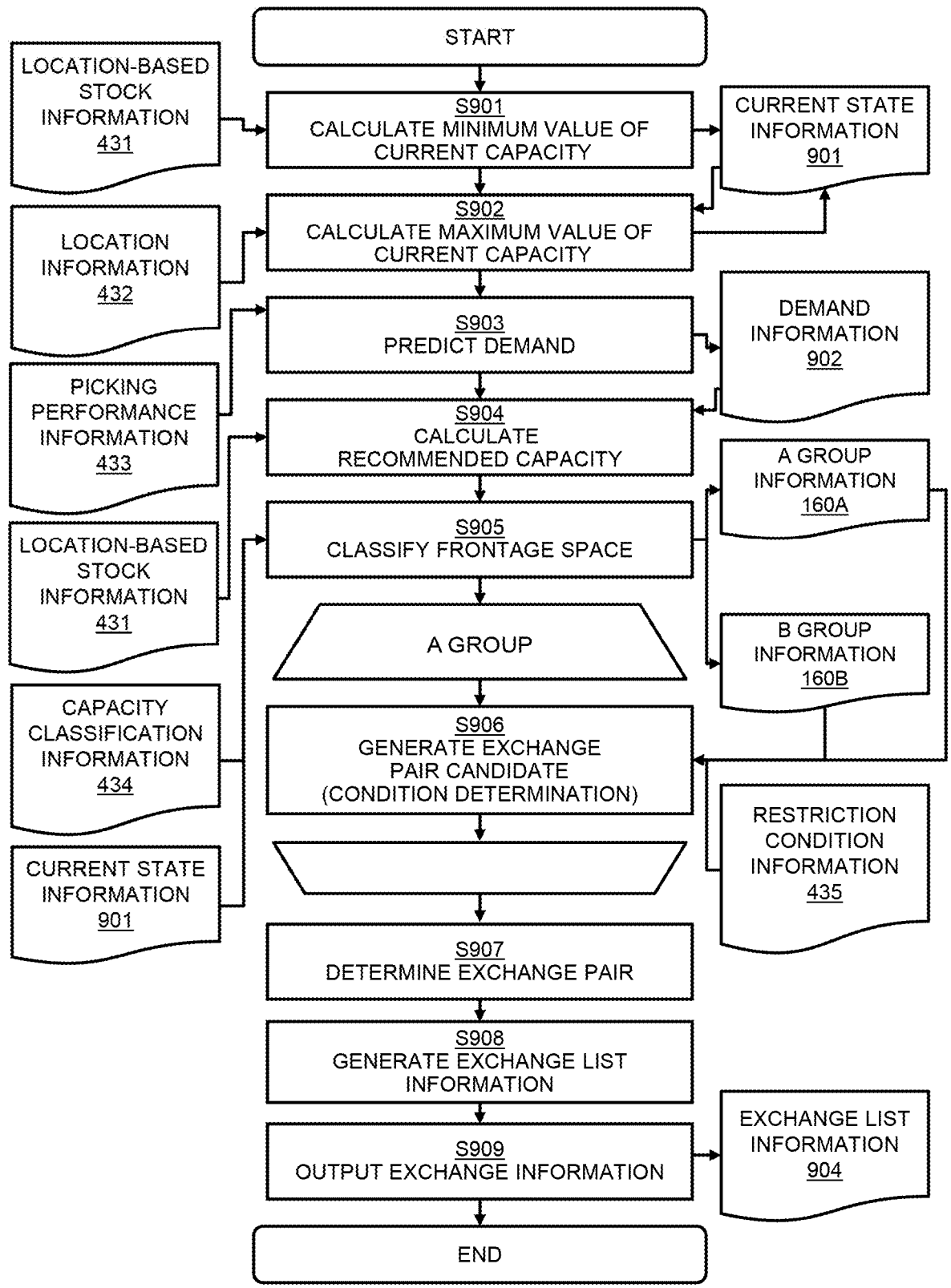
FIG. 9 shows a flowchart of placement optimization processing.

FIG. 9 shows a flowchart of the placement optimization processing.

The current state calculation section 221 refers to the location-based stock information 431 to calculate the minimum value of the current capacity (specifically, the current capacity itself) of each location (each frontage space) (S901). The current state information 901 in which the minimum value of the current capacity calculated for each location is stored is outputted, and the current state information 901 is stored in the storage apparatus 203.

The current state calculation section 221 refers to the location information 432 and the current state information 901 after S901 to calculate the maximum value of the current capacity (specifically, an expandable size in the case where the adjacent frontage space is empty) for each location (S902). The maximum value of the current capacity calculated for each location is stored in the current state information 901.

The recommendation calculation section 222 causes the demand prediction section 223 to predict a demand (specifically, e.g., the shipment volume (i.e., the order-up-to level) of each commodity in each unit time period (e.g., one day) in the specified time period (e.g., one week from the present)) based on the picking record information 433 (S903). Demand information 902 indicative of the predicted demand is outputted and is stored in the storage apparatus 203.

The recommendation calculation section 222 calculates the recommended capacity (specifically, the minimum value and the maximum value of the recommended capacity) for each location based on the demand information 902 and the location-based stock information 431 (S904).

The space classification section 224 classifies a plurality of the frontage spaces (commodities or locations) into the A group and the B group based on the current state information 901 after S902, the recommended capacity calculated for each location in S904, and the capacity classification information 434 (S905). With this, A group information 160A indicative of the A group and B group information 160B indicative of the B group are generated and stored in the storage apparatus 203.

The exchange pair determination section 226 generates, for each frontage space (location) belonging to the A group indicated by the A group information 160A, one or a plurality of exchange pair candidates each including the frontage space based on the A group information 160A, the B group information 160B, and the restriction condition information 435 (S906). Let us take one frontage space belonging to the A group as an example (a "target frontage space" in this paragraph). In the present embodiment, the target frontage space (commodity) satisfies the above-described condition (a). Accordingly, in S906, one or a plurality of the frontage spaces (commodities) which satisfy the above-described conditions (b) to (d) are selected from the frontage spaces (commodities) belonging to the B group. One or a plurality of the individual frontage spaces selected from the B group constitute the exchange pair candidates with the target frontage space.

The exchange pair determination section 226 determines one or more exchange pairs (S907). Specifically, the exchange pair determination section 226 determines one exchange pair from one or a plurality of the exchange pair candidates for each frontage space belonging to the A group (S907).

The exchange list generation section 228 generates exchange list information 904 which is information related to the list of determined one or more exchange pairs (S908).

The exchange output section 229 outputs exchange information (e.g., the generated exchange list information 904 or an exchange instruction described later) (S909).

The detail of the placement optimization processing will be described with reference to FIGS. 10 to 17. Note that, in the following description, the frontage space in which the commodity is placed is sometimes referred to as a "commodity space", and the frontage space in which the commodity is not placed is sometimes referred to as an "empty space".

S901: Calculation of Minimum Value of Current Capacity

The current state calculation section 221 refers to the location-based stock information 431 to perform calculation shown below for each location (each commodity).

current capacity(minimum value)=single-item capacity×replenishment limit

The current capacity may be registered in advance in the location-based stock information 431 for each frontage space (each location) based on, e.g., the actual dimensions of the frontage space. However, in general, the current capacity of each frontage space is not registered in the location-based stock information managed by the computer system on the user side. On the other hand, for each commodity space, the single-item capacity of the commodity placed in the commodity space and the replenishment limit which is the upper limit of the number of commodities (single commodity type) which can be placed in the commodity space are managed in the computer system on the user side. Consequently, in the present embodiment, the product of the single-item capacity and the replenishment limit in each commodity space is supposed to be (the minimum value of) the current capacity of the frontage space. Thus, it is possible to technically solve the problem where, in general, the current capacity of each frontage space is not managed in the computer system on the user side to implement the optimization of the commodity placement.

Figures 10, 11, 12:
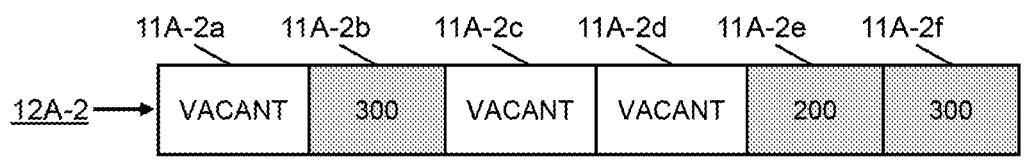
FIG. 10 shows an example of the structure of current state information.
FIG. 11 shows an example in which an empty space and a commodity space are mixed.
FIG. 12 shows a calculation method of the minimum value and the maximum value of a current capacity.
Figure 15:
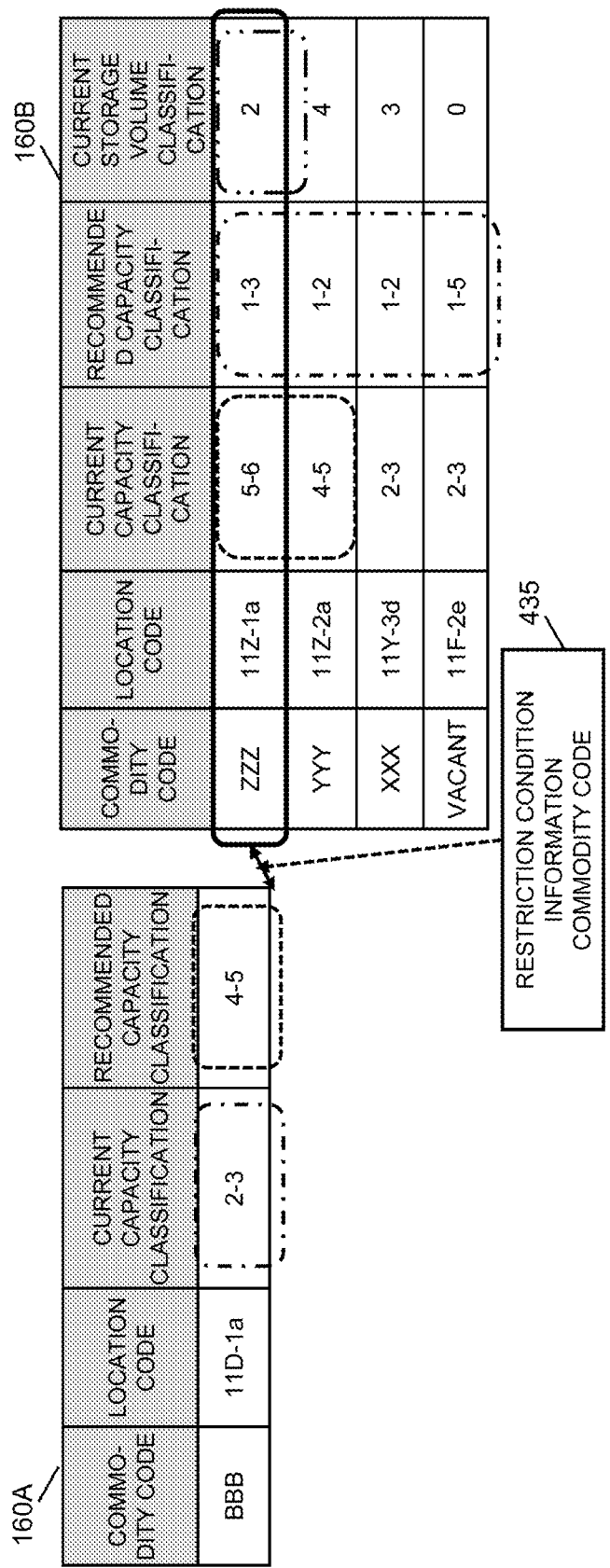
FIG. 15 schematically shows an example of generation of an exchange pair candidate.

Note that the calculated current capacity is stored in the current state information 901. An example of the structure of the current state information 901 is as shown in FIG. 10. That is, the current state information 901 indicates the current capacity calculated for each location (each commodity space). The current state information 901 has, e.g., an entry 1000 for each location. For one location (a "target location" in a description of FIG. 10) which is used as an example, the entry 1000 stores information such as a commodity code 1001, a location code 1002, a current capacity (minimum value) 1003, and a current capacity (maximum value) 1004. The commodity code 1001 indicates the commodity code of the commodity placed at the target location. The location code 1002 indicates the location code of the target location. The current capacity (minimum value) 1003 indicates the current capacity calculated in S901 for the target location. The current capacity (maximum value) 1004 indicates the current capacity (maximum value) calculated in S902 later for the target location.

S902: Calculation of Maximum Value of Current Capacity

As a result of comparing the location information 432 (information including the location codes of all frontage spaces) with the current state information 901 after S901 (information including the location codes of all commodity spaces out of all frontage spaces), in the case where one or more empty spaces are present, the current state calculation section 221 identifies the one or more empty spaces. Herein, let us assume that one or more empty spaces are present (in the case where there is no empty space, the minimum value of the current capacity of each commodity space is identical to the maximum value thereof).

When one or more empty spaces are present, the minimum value of the current capacity is different from the maximum value thereof in at least one frontage space. Specifically, for example, with regard to one frontage space (a "target frontage space" in this paragraph) which is used as an example, when one or more empty spaces which are continuously arranged are adjacent to the target frontage space (e.g., at least on one of sides of the target frontage space), the maximum value of the current capacity of the target frontage space has a value obtained by adding the sum total of one or more current capacities (minimum values) corresponding to the continuously arranged one or more empty spaces to the minimum value of the current capacity of the target frontage space.

When FIGS. 11 and 12 are used as examples, the description is as follows. That is, according to the example shown in FIG. 11, out of six frontage spaces 11A-2*a* to 11A-2*f* of a tier 12A-2, frontage spaces 11A-2*b*, 11A-2*e*, and 11A-2*f* are commodity spaces, and the remaining frontage spaces 11A-2*a*, 11A-2*c*, and 11A-2*d* are empty spaces. In the tier 12A-2, the current capacities of the six frontage spaces 11A-2*a* to 11A-2*f* (minimum values) are not equal to each other. Therefore, even when the current capacities (minimum values) of the commodity spaces 11A-2*b*, 11A-2*e*, and 11A-2*f* are determined from the current state information 901, the current capacities (minimum values) of the empty spaces 11A-2*a*, 11A-2*c*, and 11A-2*d* are not determined.

To cope with this, in the present embodiment, the current state calculation section 221 identifies a location tier capacity 602 of the tier 12A-2 from the location information 432, and calculates the individual current capacities (minimum values) of the empty spaces 11A-2a, 11A-2c, and 11A-2d in the following manner.

current capacity(minimum value)=(location tier capacity−(sum total of current capacities(minimum values) of all commodity spaces in tier))÷number of empty spaces That is, the current capacities (minimum values) of the three empty spaces 11A-2a, 11A-2c, and 11A-2d in the tier 12A-2 are defined to be equal to each other.

Subsequently, the current state calculation section 221 calculates the current capacity (maximum value) for each of the frontage spaces 11A-2a to 11A-2f in the following manner.

When no empty space is adjacent to the frontage space, the current capacity (maximum value) has the same value as that of the current capacity (minimum value).

When one or more empty spaces which are continuously arranged are adjacent to the frontage space, the current capacity (maximum value) has the total value of the current capacity (minimum value) and the sum of one or more current capacities (minimum values) corresponding to the one or more empty spaces.

As a result, the current capacities (minimum values) and the current capacities (maximum values) of the individual frontage spaces 11A-2a to 11A-2f are as shown in the example in FIG. 12 (the tier capacity of the tier 12A-2 is "1400"). Thus, it is possible to define the current capacity (maximum value) larger than the current capacity (minimum value) for the frontage space to which the empty space is adjacent and, therefore, it can be expected that the commodity placement will be made more appropriate.

Note that, in the generation of the exchange pair candidate, both of the minimum value and the maximum value of the current capacity of the frontage space are seen. As a result of using the capacity which is larger than the minimum value of the current capacity and equal to or smaller than the maximum value of the current capacity, with regard to a frontage space T which is determined to be an element of the exchange pair, and, among one or more frontage spaces (empty spaces) adjacent to the frontage space T, a frontage space related to a capacity corresponding to an expansion portion (e.g., one frontage space (empty space) U), the information 1003 and the information 1004 in the current state information 901 may be updated by, e.g., the exchange pair determination section 226. Specifically, for example, the following update may be performed.

The current capacity (minimum value) 1003 of the frontage space T is updated to the same value as that of the current capacity (maximum value) 1004 of the frontage space T before update.

The current capacity (maximum value) 1004 of the frontage space T is updated to "0" (a value meaning no capacity).

Each of the current capacity (minimum value) 1003 and the current capacity (maximum value) 1004 of the frontage space U is updated to "0".

S903: Prediction of Demand

Demand prediction is prediction of the shipment volume in each unit time period in the specified time period (e.g., future one week). As the method of the demand prediction, any method may be used. For example, the demand prediction section 223 calculates the shipment volume per day for, e.g., each commodity based on the picking record information 433. In addition, the demand prediction section 223 calculates a deviation of the shipment volume (e.g., standard deviation $\sigma$). Further, the demand prediction section 223 removes an outlier (e.g., a value which deviates from an average by $N\sigma$ (N is a natural number) or more). The demand prediction section 223 constructs a model by using regression. The demand prediction section 223 predicts the shipment volume in the specified time period by using the constructed model. The demand information 902 (see FIG. 9) indicative of the result of the demand prediction is outputted. The demand information 902 indicates a predicted shipment volume in each unit time period in the specified time period for each location. In each unit time period, the predicted shipment volume may be, e.g., a predicted value of the maximum shipment volume in the unit time period.

S904: Calculation of Recommended Capacity

The recommendation calculation section 222 performs the following for each location. Hereinbelow, let us take one location as an example (a "target location" in a description of S904).

The recommendation calculation section 222 identifies the maximum predicted shipment volume for the target location based on the demand information 902. Hereinbelow, the maximum predicted shipment volume is referred to as a "recommended order-up-to level". Note that the recommended order-up-to level is an example of the shipment volume based on a plurality of the predicted shipment volumes corresponding to a plurality of the unit time periods belonging to the specified time period.

The recommendation calculation section 222 calculates a deviation of the predicted shipment volume (e.g., a difference between the maximum value and the minimum value of the predicted shipment volume in the specified time period) from the demand information 902 for the target location.

The recommendation calculation section 222 calculates the following for the target location.

recommended order-up-to level(maximum value)= recommended order-up-to level+deviation recommended order-up-to level(minimum value)= recommended order-up-to level−deviation The recommendation calculation section 222 calculates the following for the target location. The number of days of stocking and the single-item capacity can be identified from the location-based stock information 431 by using the location code of the target location as a key.

recommended capacity(maximum value)="recommended order-up-to level (maximum value)"× "number of days of stocking"×"single-item capacity"

recommended capacity(minimum value)="order-up-to level(minimum value)"×"number of days of stocking"×"single-item capacity"

According to the above description, as the result of the demand prediction, the predicted shipment volume is obtained for each unit time period in the specified time period. The recommended capacity of the frontage space in which the commodity having a deviation in a plurality of the predicted shipment volumes belonging to the specified time period is placed has the minimum value and the maximum value. The recommended capacity (minimum value) is based on a value obtained by subtracting the deviation from the recommended order-up-to level, and the recommended capacity (maximum value) is based on a value obtained by adding the deviation to the recommended order-up-to level.

The demand prediction is not always accurate. However, even when the demand prediction is inaccurate, by providing the recommended capacity with the range in the manner described above, it is possible to optimize the commodity placement. Note that, in at least one of the calculations of the minimum value and the maximum value of the recommended capacity, a value other than the recommended order-up-to level and the deviation of the predicted shipment volume may be used.

In addition, according to the above description, with regard to the frontage space (at least the commodity space), the recommended capacity of the frontage space is based on the recommended order-up-to level (an example of the shipment volume based on a plurality of the predicted shipment volumes belonging to the specified time period), the number of days of stocking (an example of the number of stocking unit time periods which is the number of days when the commodity to be shipped in the unit time period is stored (an example of the number of unit time periods)), and the single-item capacity of the commodity. The reason why the number of days of stocking and the single-item capacity are used in the calculation of the recommended capacity is that the recommended capacity is compared with the current capacity for the generation of the exchange pair candidate, and the replenishment limit serving as the element of the current capacity is the upper limit of the product of the number of days of stocking and the single-item capacity.

<S905: Classification of Frontage Space>

The space classification section 224 classifies (converts into a numerical form) each of the current capacity (minimum value), the current capacity (maximum value), the recommended capacity (minimum value), and the recommended capacity (maximum value) by using the capacity classification information 434 for each frontage space (each location). With this, the current capacity classification and the recommended capacity classification are obtained. Note that, in the present embodiment, the classification (conversion into a numerical form) of the capacity is used but, instead of the classification of the capacity, the capacity itself may also be used.

The space classification section 224 classifies a plurality of the frontage spaces (e.g., at least a plurality of the commodity spaces) into the A group and the B group. For example, the A group may be a group having the current capacity classification (e.g., the minimum value of the current capacity classification) which is smaller than the recommended capacity classification (e.g., the minimum value of the recommended capacity classification). The B group may be a group having the current capacity classification (e.g., the minimum value of the current capacity classification) which is larger than the recommended capacity classification (e.g., the minimum value of the recommended capacity classification).

In S905, the A group information 160A and the B group information 160B are generated.

As shown in, e.g., FIG. 13, the A group information 160A has an entry 1300 for each frontage space (commodity) classified into the A group. For one frontage space which is used as an example (a "target frontage space" in a description of FIG. 13), the entry 1300 stores information such as a commodity code 1301, a location code 1302, a current capacity classification 1303, a recommended capacity classification (minimum value) 1304, a recommended capacity classification (maximum value) 1305, a recommended order-up-to level (minimum value) 1306, a recommended order-up-to level (maximum value) 1307, a maximum shipment volume 1308, a capacity difference 1309, and an emergency replenishment frequency 1310. The commodity code 1301 indicates the commodity code of the commodity placed in the target frontage space. The location code 1302 indicates the location code of the location corresponding to the target frontage space. The current capacity classification 1303 indicates the obtained current capacity classification (minimum value and maximum value) of the target frontage space. The recommended capacity classification (minimum value) 1304 indicates the recommended capacity classification (minimum value) of the target frontage space obtained in S904. The recommended capacity classification (maximum value) 1305 indicates the recommended capacity classification (maximum value) of the target frontage space obtained in S904. The recommended order-up-to level (minimum value) 1306 indicates the recommended order-up-to level (minimum value) of the target frontage space obtained in S904. The recommended order-up-to level (maximum value) 1307 indicates the recommended order-up-to level (maximum value) of the target frontage space obtained in S904. The maximum shipment volume 1308 indicates the recommended order-up-to level (the maximum value of a plurality of the predicted shipment volumes in the specified time period) of the target frontage space identified in S904. The capacity difference 1309 indicates the capacity difference (a value obtained by subtracting a median value of the recommended capacity classification from a median value of the current capacity classification) of the target frontage space obtained in S905. The emergency replenishment frequency 1310 indicates a frequency of emergency replenishment of the target frontage space with the commodity. The emergency replenishment frequency 1310 may be, e.g., information obtained from information (not shown) which is managed in the computer system on the user side, or may also be information inputted via the input/output apparatus 170 by the user.

As shown in, e.g., FIG. 14, the B group information 160B has an entry 1400 for each frontage space (commodity) classified into the B group. For one frontage space which is used as an example (a "target frontage space" in a description of FIG. 14), the entry 1400 stores information such as a storage volume 1411 in addition to pieces of information 1401 to 1410 which are identical to the pieces of information 1301 to 1310. The storage volume 1411 indicates the storage volume which is the number of commodities (single commodity type) which are currently placed (stored) in the target frontage space. The product of the storage volume 1411 and the single-item capacity of the commodity corresponds to the storage volume (capacity) and, by referring to the capacity classification information 434 with the storage volume which is used as a key, a storage volume classification (obtained by converting the storage volume into a numerical form) is obtained. Note that an example of the reason why the B group information 160B has the storage volume 1411 and the A group information 160A does not need to have information indicative of the storage volume is as follows.

Transfer of the commodity from the frontage space belonging to the B group to the frontage space belonging to the A group denotes transfer of the commodity to the frontage space having the smaller current capacity classification and, in such a case, all of the commodities which are already present in the transfer-source frontage space can not necessarily be placed in the transfer-destination frontage space.

Transfer of the commodity from the frontage space belonging to the A group to the frontage space belonging to the B group denotes transfer of the commodity to the frontage space having the larger current capacity classification and, in such a case, all of the commodities which are already present in the transfer-source frontage space can be placed in the transfer-destination frontage space.

S906: Generation of Exchange Pair Candidate

With regard to each of the frontage spaces belonging to the A group and the B group, the frontage space which is larger in at least one of the shipment volume, an absolute value of a difference between the current capacity value and the recommended capacity value, and the emergency replenishment frequency is selected as the candidate for the element constituting the exchange pair more preferentially. With this, it is possible to select the commodity which is supposed to have a high exchange effect as the exchange pair candidate preferentially. Specifically, for example, the exchange pair determination section 226 rearranges the entries in each of the A group information 160A and the B group information 160B in the following manner. Note that the reason why descending order of the shipment volume is used is that it seems that the picking operation is frequently performed (and the replenishment frequency is high) when the shipment volume is large, and hence, the larger the shipment volume is, the higher the exchange effect is.

(S906-01) A plurality of the entries are arranged in descending order of the shipment volume.

(S906-02) After S906-01, when the entries having the same shipment volume are present, the entries having the same shipment volume are arranged in descending order of the absolute value of the capacity difference.

(S906-03) After S906-02, when the entries having the same absolute value of the capacity difference are present, the entries having the same absolute value of the capacity difference are arranged in descending order of the emergency replenishment frequency.

When one or more exchange pair candidates are present, the exchange pair determination section 226 identifies the one or more exchange pair candidates. In the identification of the exchange pair candidate, the entries are seen sequentially from the top entry in each of the A group information 160A and the B group information 160B. That is, the entries are seen sequentially from the entry of the frontage space which is supposed to have the high exchange effect. The number of exchange pair candidates may have the upper limit. In this case, the frontage space pair supposed to have the high exchange effect is preferentially identified as the exchange pair candidate.

Each exchange pair candidate is a pair of a frontage space A (a frontage space belonging to the A group) and a frontage space B (a frontage space belonging to the B group), and is a pair which satisfies the following conditions (a) to (e). Note that the condition (a) is satisfied by the frontage space classification in S905.

(a) The current capacity value of the frontage space A is smaller than the recommended capacity value of the frontage space A, or the current capacity value of the frontage space B is larger than the recommended capacity value of the frontage space B.

(b) The recommended capacity value of the frontage space B satisfies the current capacity value of the frontage space A.

(c) The recommended capacity value of the frontage space A satisfies the current capacity value of the frontage space B.

(d) The current storage volume value of the frontage space B satisfies the current capacity value of the frontage space A.

(e) Both of the frontage spaces A and B satisfy a restriction condition indicated by the restriction condition information 435.

The entry which satisfies the condition (b) is specifically the entry which satisfies the following (b1) and (b2). According to an example in FIG. 15, the recommended capacity classification (minimum value) of the commodity XXX of "1" is equal to or smaller than the current capacity classification (maximum value) of the commodity BBB of "3", and the recommended capacity classification (maximum value) of the commodity XXX of "2" is equal to or larger than the current capacity classification (minimum value) of the commodity BBB of "2". Therefore, the pair of the frontage space of the commodity XXX and the frontage space of the commodity BBB satisfies the condition (b) (see frames in a one-dot chain line).

(b1) The recommended capacity classification (minimum value) of the frontage space B is equal to or smaller than the current capacity classification (maximum value) of the frontage space A.

(b2) The recommended capacity classification (maximum value) of the frontage space B is equal to or larger than the current capacity classification (minimum value) of the frontage space A.

The entry which satisfies the condition (c) is specifically the entry which satisfies the following (c1) and (c2). According to the example in FIG. 15, the recommended capacity classification (minimum value) of the commodity BBB of "4" is equal to or smaller than the current capacity classification (maximum value) of the commodity ZZZ of "6", and the recommended capacity classification (maximum value) of the commodity BBB of "5" is equal to or larger than the current capacity classification (minimum value) of the commodity ZZZ of "5". Therefore, the pair of the frontage space of the commodity BBB and the frontage space of the commodity ZZZ satisfies the condition (c) (see frames in a broken line).

(c1) The recommended capacity classification (minimum value) of the frontage space A is equal to or smaller than the current capacity classification (minimum value) of the frontage space B.

(c2) The recommended capacity classification (maximum value) of the frontage space A is equal to or larger than the current capacity classification (minimum value) of the frontage space B.

A specific example of the entry which satisfies the condition (d) is the entry of the frontage space B, and the current storage volume classification of the frontage space B is equal to or larger than the current capacity classification (minimum value) of the frontage space A, or equal to or smaller than the current capacity classification (maximum value) of the frontage space A. According to the example in FIG. 15, the current storage volume classification of the commodity ZZZ of "2" satisfies the condition (d) (see a frame in a two-dot chain line). Note that the "current storage volume classification" is obtained by classifying (converting into a numerical form) the storage volume 1411.

According to the condition (e), the entry is selected based on the restriction condition information 435 irrespective of whether or not the above-described conditions (a) to (d) are satisfied. For example, the restriction condition indicated by the restriction condition information 435 is the condition indicative of restriction related to commodity exchange, and includes, e.g., at least one of the following. An entry pair which satisfies the following restriction condition is identified.

An attribute related to the commodity (e.g., the commodity code or the weight of the commodity (single item)) and an attribute of the tier in which the commodity should or should not be placed (e.g., the commodity should or should not be placed in the tiers up to the m-th tier from the top)

The attribute related to the commodity and an area in which the commodity should or should not be placed An attribute related to the commodity which cannot be exchanged An attribute related to the commodity which is allowed to overflow from the frontage space Thus, the exchange pair candidate which satisfies the conditions (a) to (e) is identified.

S907: Determination of Exchange Pair

The exchange pair determination section 226 narrows down one or a plurality of the exchange pair candidates to one exchange pair for each frontage space (commodity) belonging to the A group. Specifically, the exchange pair determination section 226 determines one or more exchange pairs which optimize picking operation time from a plurality of the exchange pair candidates. More specifically, for example, the exchange pair determination section 226 may input information related to a plurality of the exchange pair candidates generated in S908 to the exchange effect measurement section 227 including the model for prediction of the picking operation time to determine one or more exchange pairs which optimize the picking operation time. When the determination of the exchange pair in which the picking operation time is not taken into consideration is performed, as shown on the left side in FIG. 16 as an example, a problem can arise in that the traffic line of a plurality of workers cannot be taken into consideration and congestion occurs, or a combination of commodities in one order cannot be taken into consideration and a movement distance is increased. However, by performing the determination of the exchange pair in which the picking operation time is taken into consideration, as shown on the right side in FIG. 16 as an example, the above-described problem can be solved. That is, it is possible to implement commodity placement which is unlikely to cause the congestion or commodity placement which reduces the movement distance in one order. The exchange effect measurement section 227 predicts operation time including the picking operation time before exchange and the operation time after the exchange based on the shelf placement information 436 which is information related to the placement of a plurality of the shelves. The "operation time including the picking operation time" in the present embodiment is the picking operation time itself, but may include time required for other types of operations such as an exchange operation of the commodity in addition to the picking operation time.

In S907, for example, the exchange pair determination section 226 may perform the following.

(S907-1) From a plurality of the exchange pair candidates, the top frontage space among the frontage spaces which belong to the A group and are not selected is selected.

(S907-2) With regard to the frontage space selected in S907-1, information related to one or a plurality of the exchange pair candidates is inputted to the exchange effect measurement section 227. The exchange effect measurement section 227 measures the picking operation time before exchange and the picking operation time after the exchange for each exchange pair candidate. With this, the exchange pair which reduces the picking operation time most as the result of the exchange is determined.

(S907-3) Based on the exchange pair selected in S907-2, at least part of the current state information 901, the A group information 160A, and the B group information 160B is updated on an as-needed basis (e.g., in the case where the expansion portion of the current capacity is used for the exchange pair). In addition, if the necessity arises due to the update (e.g., in the case where a given frontage space belonging to the A group has ceased to satisfy the condition due to a reduction in the current capacity (maximum value) of the frontage space belonging to the B group), the number of exchange pair candidates is reduced.

(S907-4) It is determined whether or not the frontage space which belongs to the A group and is not selected is present in a plurality of the exchange pair candidates. In the case where the determination result in S907-4 is true, processing returns to S907-1. In the case where the determination result in S907-4 is false, S907 is ended.

Thus, the exchange pair determination section 226 determines one or more exchange pairs based on the result of the exchange effect measurement of each of a plurality of the exchange pair candidates. In other words, it is possible to use the exchange effect measurement section 227 to verify the effect of each exchange pair candidate and determine the exchange pair based on the result of the verification.

S908: Generation of Exchange List Information

The exchange list generation section 228 generates the exchange list information 904 indicative of the list of the exchange pair determined in S907. As shown in, e.g., FIG. 17, the exchange list information 904 has an entry 1700 for each exchange pair. For one exchange pair which is used as an example (a "target exchange pair" in a description of FIG. 17), the entry 1700 stores pieces of information 1701 to 1705 related to a frontage space A (a frontage space belonging to the A group) of the target exchange pair, and pieces of information 1706 to 1710 related to a frontage space B (a frontage space belonging to the group B) of the target exchange pair. Specifically, for example, the entry 1700 stores the location code (A group) 1701, the current capacity classification (A group) 1702, the commodity code (A group) 1703, the commodity name (A group) 1704, the single-item capacity (A group) 1705, the location code (B group) 1706, the current capacity classification (B group) 1707, the commodity code (B group) 1708, the commodity name (B group) 1709, and the single-item capacity (B group) 1710. The location code (A group) 1701 indicates the location code of the frontage space A. The current capacity classification (A group) 1702 indicates the current capacity classification (minimum value and maximum value) of the frontage space A. The commodity code (A group) 1703 indicates the commodity code of a commodity A (a commodity placed in the frontage space A). The commodity name (A group) 1704 indicates the name of the commodity A. The single-item capacity (A group) 1705 indicates the single-item capacity of the commodity A. The location code (B group) 1706 indicates the location code of the frontage space B. The current capacity classification (B group) 1707 indicates the current capacity classification (minimum value and maximum value) of the frontage space B. The commodity code (B group) 1708 indicates the commodity code of a commodity B (a commodity placed in the frontage space B). The commodity name (B group) 1709 indicates the name of the commodity B. The single-item capacity (B group) 1710 indicates the single-item capacity of the commodity B. Each of the commodity name (A group) 1704 and the commodity name (B group) 1709 may be, e.g., information managed in the computer system on the user side.

S909: Output of Exchange Information

The exchange output section 229 outputs the exchange information. The exchange information is the information related to the commodity exchange, and is, e.g., the exchange list information 904 or the exchange instruction (the instruction to exchange commodities between the frontage spaces constituting the exchange pair) generated based on the exchange list information 904 (or each exchange pair). For example, S909 may be at least one of the following.

The exchange output section 229 displays the exchange list information 904 in the input/output apparatus 170.

The exchange output section 229 generates one or more exchange instructions which are one or more instructions for exchange corresponding to determined one or more exchange pairs, and transmits the one or more exchange instructions to a mobile terminal (e.g., a laptop or tablet personal computer) of a worker who works in the area 301 where a plurality of the shelves 310 are placed, or a robot system including a robot which performs an operation including at least one of the exchange operation, the picking operation, and a conveyance operation of the commodity in the area 301 where a plurality of the shelves 310 are placed.

While the embodiment of the present invention has been described thus far, the embodiment has been described as an example for the description of the present invention, and it is not intended to limit the scope of the present invention only to the embodiment. The present invention can be executed in other various forms. For example, the present invention can also be applied to an environment where a robot system in which the picking operation and the conveyance of an article are automated (e.g., a system in which a robot capable of autonomous travel performs the picking operation and the conveyance) is installed.

What is claimed is:

1. An article placement optimization system comprising:
   a recommendation calculation section configured to calculate, for each of a plurality of frontage spaces which are held by a plurality of shelves and in which a plurality of articles are placed, a recommended capacity value of the article based on a predicted shipment volume obtained as a result of demand prediction of the article placed in the frontage space in a future specified time period; and
   an exchange pair determination section configured to determine one or more exchange pairs which are frontage space pairs in each of which articles are exchanged based on a current capacity value and the recommended capacity value of each of the plurality of frontage spaces, wherein
   the current capacity value of each frontage space is a value which means a capacity of the frontage space,
   the recommended capacity value of each frontage space is a value which means a frontage space capacity predicted to be required by the article placed in the frontage space in a unit time period in the specified time period, and
   each of the one or more exchange pairs satisfies the following conditions:
   (a) the current capacity value of a first frontage space which is one of frontage spaces constituting the exchange pair is smaller than the recommended capacity value of the first frontage space, or the current capacity value of a second frontage space which is another one of the frontage spaces constituting the exchange pair is larger than the recommended capacity value of the second frontage space,
   (b) the recommended capacity value of the second frontage space satisfies the current capacity value of the first frontage space, and
   (c) the recommended capacity value of the first frontage space satisfies the current capacity value of the second frontage space.

2. The article placement optimization system according to claim 1, wherein
   each of the one or more exchange pairs further satisfies the following condition:
   (d) a current storage volume value which is a value meaning a capacity occupied by the article placed in the second frontage space satisfies the current capacity value of the first frontage space.

3. The article placement optimization system according to claim 2, wherein
   each of the one or more exchange pairs further satisfies a restriction condition which is one or a plurality of conditions related to restriction of article exchange.

4. The article placement optimization system according to claim 1, wherein
   the exchange pair determination section determines one or a plurality of exchange pair candidates each of which satisfies (a) to (c), and determines the one or more exchange pairs from the one or the plurality of exchange pair candidates based on a result of exchange effect measurement of each of the one or the plurality of exchange pair candidates, and
   the exchange effect measurement includes prediction of operation time including picking operation time before exchange and the operation time including the picking operation time after the exchange based on shelf placement information which is information related to placement of the plurality of shelves.

5. The article placement optimization system according to claim 1, further comprising:
   a current state calculation section for calculating, for each article space which is the frontage space in which the article is placed, the current capacity value of the article space based on a single-item capacity of the article placed in the article space and a replenishment limit which is an upper limit of the number of the articles which can be placed in the article space.

6. The article placement optimization system according to claim 5, wherein
   with regard to a tier including an empty space which is the frontage space in which the article is not placed, the current state calculation section determines the current capacity value of each empty space present in the tier based on a value obtained by subtracting the sum total of the current capacity value of every article space in the tier from a capacity value of the tier and the number of the empty spaces present in the tier, and
   the current state calculation section determines, for each frontage space to which one or more empty spaces which are continuously arranged are adjacent in the tier, the current capacity value of the frontage space to be a minimum value of the current capacity value of the frontage space, and determines the sum total of the current capacity value of the frontage space and the current capacity value of the one or more empty spaces adjacent to the frontage space to be a maximum value of the current capacity value of the frontage space.

7. The article placement optimization system according to claim 1, wherein
   in a tier including an empty space which is the frontage space in which the article is not placed, the current capacity value of the frontage space to which one or more empty spaces which are continuously arranged are adjacent has a minimum value and a maximum value, the minimum value is the current capacity value of the frontage space, and the maximum value is the sum total of the current capacity value of the frontage space and the current capacity value of the one or more empty spaces adjacent to the frontage space.

8. The article placement optimization system according to claim 1, wherein the predicted shipment volume is obtained as a result of the demand prediction for each unit time period in the specified time period, the recommended capacity value of the frontage space in which the article having a deviation in a plurality of the predicted shipment volumes belonging to the specified time period is placed has a minimum value and a maximum value, the minimum value is based on a value obtained by subtracting the deviation from a shipment volume based on the plurality of the predicted shipment volumes, and the maximum value is based on a value obtained by adding the deviation to the shipment volume based on the plurality of the predicted shipment volumes.

9. The article placement optimization system according to claim 1, wherein the predicted shipment volume is obtained as a result of the demand prediction for each unit time period in the specified time period, and the recommended capacity value of the frontage space in which the article is placed is based on a shipment volume based on a plurality of the predicted shipment volumes belonging to the specified time period, the number of stocking unit time periods which is the number of unit time periods in which the number of articles to be shipped in the unit time period is stored, and a single-item capacity of the article.

10. The article placement optimization system according to claim 1, further comprising:

a space classification section for classifying, among the plurality of frontage spaces, at least each frontage space in which the article is placed into an A group having the current capacity value which is smaller than the recommended capacity value, or a B group having the current capacity value which is larger than the recommended capacity value, wherein in each of the one or more exchange pairs, the first frontage space is the frontage space belonging to the A group, and the second frontage space is the frontage space belonging to the B group.

11. The article placement optimization system according to claim 10, wherein in each of the A group and the B group, the frontage space which is larger in at least one of a shipment volume, an absolute value of a difference between the current capacity value and the recommended capacity value, and an emergency replenishment frequency is selected as a candidate for an element constituting the exchange pair more preferentially.

12. The article placement optimization system according to claim 1, further comprising:

an exchange output section for generating one or more exchange instructions which are one or more instructions for exchange corresponding to the determined one or more exchange pairs, and transmitting the one or more exchange instructions to a mobile terminal of a worker who works in an area where the plurality of shelves are placed, or a robot system including a robot which performs an operation including at least one of an exchange operation, a picking operation, and a conveyance operation of articles in the area where the plurality of shelves are placed.

13. An article placement optimization method comprising:

calculating, for each of a plurality of frontage spaces which are held by a plurality of shelves and in which a plurality of articles are placed, a recommended capacity value of the article based on a predicted shipment volume obtained as a result of demand prediction of the article placed in the frontage space in a future specified time period; and determining one or more exchange pairs which are frontage space pairs in each of which exchange of the article is performed based on a current capacity value and the recommended capacity value of each of the plurality of frontage spaces, wherein the current capacity value of each frontage space is a value which means a capacity of the frontage space, the recommended capacity value of each frontage space is a value which means a frontage space capacity predicted to be required by the article placed in the frontage space in a unit time period in the specified time period, and each of the one or more exchange pairs satisfies the following conditions:

(a) the current capacity value of a first frontage space which is one of frontage spaces constituting the exchange pair is smaller than the recommended capacity value of the first frontage space, or the current capacity value of a second frontage space which is another one of the frontage spaces constituting the exchange pair is larger than the recommended capacity value of the second frontage space, (b) the recommended capacity value of the second frontage space satisfies the current capacity value of the first frontage space, and (c) the recommended capacity value of the first frontage space satisfies the current capacity value of the second frontage space.

14. A computer program for causing a computer to execute:

calculating, for each of a plurality of frontage spaces which are held by a plurality of shelves and in which a plurality of articles are placed, a recommended capacity value of the article based on a predicted shipment volume obtained as a result of demand prediction of the article placed in the frontage space in a future specified time period; and determining one or more exchange pairs which are frontage space pairs in each of which exchange of the article is performed based on a current capacity value and the recommended capacity value of each of the plurality of frontage spaces, wherein the current capacity value of each frontage space is a value which means a capacity of the frontage space, the recommended capacity value of each frontage space is a value which means a frontage space capacity predicted to be required by the article placed in the frontage space in a unit time period in the specified time period, and each of the one or more exchange pairs satisfies the following conditions:
(a) the current capacity value of a first frontage space which is one of frontage spaces constituting the exchange pair is smaller than the recommended capacity value of the first frontage space, or the current capacity value of a second frontage space which is another one of the frontage spaces constituting the exchange pair is larger than the recommended capacity value of the second frontage space,
(b) the recommended capacity value of the second frontage space satisfies the current capacity value of the first frontage space, and
(c) the recommended capacity value of the first frontage space satisfies the current capacity value of the second frontage space.

* * * * *